July 10, 1962 H. N. FAWCETT 3,043,918

MAGNETIC HEAD AND METHOD OF OPERATION

Filed Aug. 10, 1956

INVENTOR
HOWARD NORRIS FAWCETT
BY Eugene E. Geoffrey Jr.
ATTORNEY 3,043,918
Patented July 10, 1962

3,043,918

MAGNETIC HEAD AND METHOD OF OPERATION

Howard Norris Fawcett, Briarcliff Manor, N.Y., assignor to Cambridge Instrument Company, Inc., New York, N.Y., a corporation of New York Filed Aug. 10, 1956, Ser. No. 603,286
12 Claims. (Cl. 179—100.2)

This invention relates to magnetic heads of the type used in connection with recording and reproducing devices and more specifically to an improved magnetic head and method of operation for neutralizing the effect of stray magnetic fields.

Magnetic devices for recording and reproducing electric signals are widely used in industry for a variety of purposes with probably the most outstanding example being the recording and reproducing of electric signals utilizing magnetic disks, tape and other similar mediums. In this case, the magnetic heads are made with a portion of the core exposed for cooperation with the medium. As a portion of the core must necessarily be exposed stray magnetic fields will affect the head and produce unwanted electric signals in the coil carried thereby. With high impedance heads such as pickup heads, this unwanted signal is relatively large and seriously interferes with the reproduction of the wanted signals on the medium. In general, these stray fields are produced by electromagnetic devices such as transformers and motors and the like energized by 60 cycle alternating current and they are evident in the reproduced signal in the form of hum.

A considerable effort has been made to reduce hum pickup in magnetic reproducing heads and other similar devices by the use of magnetic shields of various forms. However, shielding the head itself is not effective as a portion must be exposed so that it can be influenced by the recording medium, and reducing the intensity of stray fields by shielding the sources is exceedingly expensive and adds substantially to the size and weight of the equipment. Another procedure that has been suggested is to utilize a second magnetic coil adjacent to and connected with the pickup head to neutralize or cancel the effect of hum pickup by the pickup head. The use of a second magnetic coil in this manner not only results in materially increased costs of materials but also requires exceedingly careful and precise orientation of the second coil. Moreover, notwithstanding the care and precision with which the second coil is positioned, inasmuch as the two coils cannot occupy the same position in space, they are necessarily affected differently by stray fields so that even a reasonable degree of hum neutralization beyond that obtainable with conventional shielding is difficult if not impossible to affect.

One object of the invention is to overcome the difficulties heretofore encountered in effecting hum neutralization in magnetic heads by providing a new and improved method and apparatus that will afford highly effective hum neutralization within the head itself and without the need for auxiliary coils or extensive shielding for attenuating the stray fields themselves. For example, with this invention hum levels can be reduced more than 30 db below that of known types of heads with conventional shielding.

Another object of the invention resides in the provision of an improved method for neutralizing the effect of stray fields on magnetic heads that is characterized by its simplicity, low cost and ease of operation.

Still another object of the invention is a novel and improved magnetic pickup head embodying means for quickly and effectively neutralizing the effect of stray fields thereon.

The above and other objects and advantages of the invention will become more apparent from the following description and accompanying drawings forming part of this application.

Figures 1, 2, 3, 4, 5, 6, 7, 8, 9, 10:
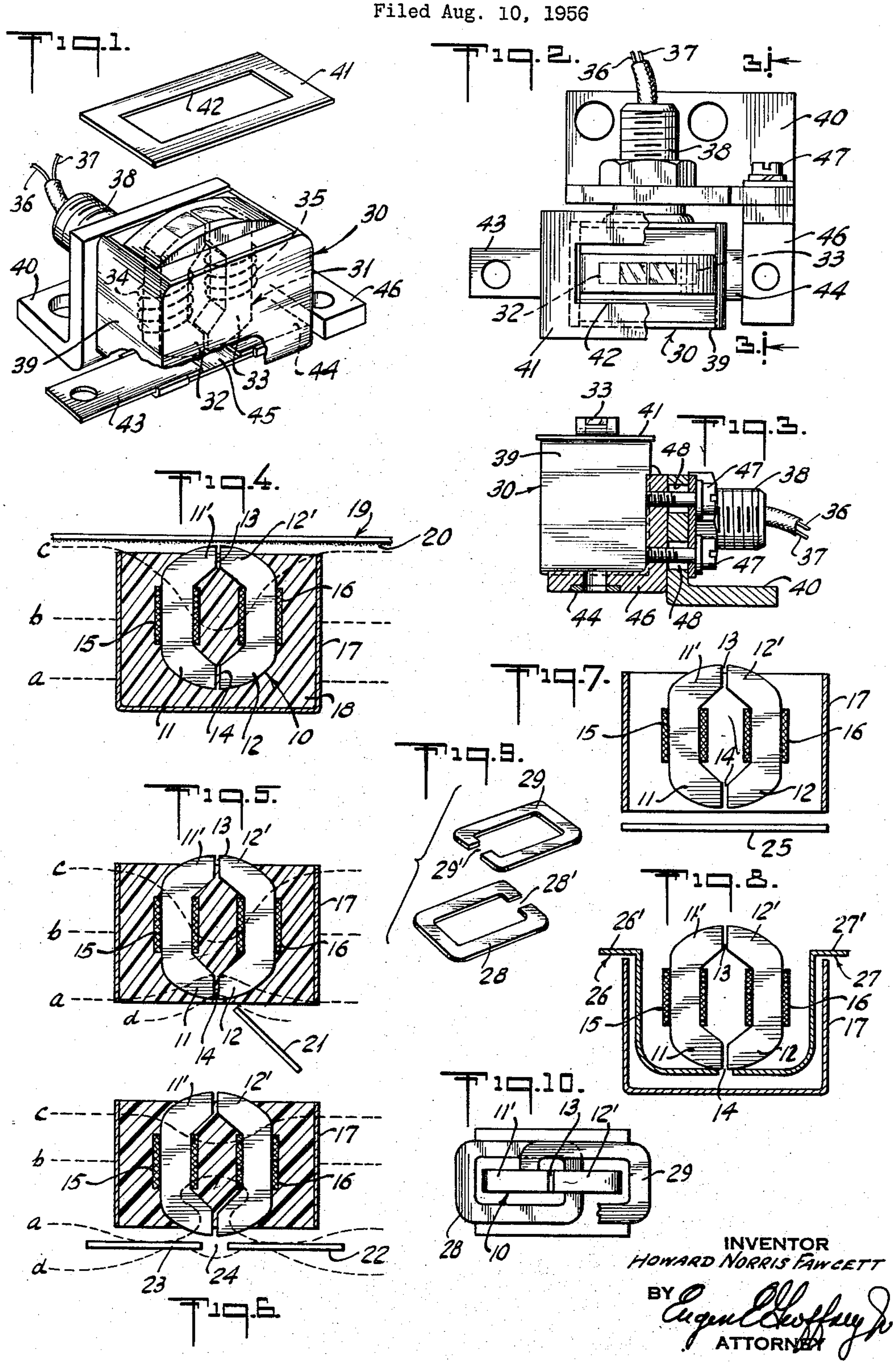
FIG. 1 is a partially exploded view, in perspective, of one embodiment of the invention.
FIG. 2 is a plan view in partial section of the embodiment of the invention shown in FIG. 1.
FIG. 3 is a cross sectional view of FIG. 2 taken along the line 3—3 thereof.
FIG. 4 is a diagrammatic view, in cross section of a conventional magnetic head for use in tape recording and reproducing apparatus.
FIG. 5 is a diagrammatic view of the magnetic head of FIG. 4 modified in accordance with one embodiment of the invention.
FIG. 6 is a diagrammatic view of a magnetic head corresponding to the embodiment of FIGS. 1 to 3 to illustrate the operation thereof.
FIGS. 7 and 8 are diagrammatic views of still further embodiments of the invention.
FIGS. 9 and 10 show still another embodiment of the invention.

The shielding of magnetic devices such as magnetic heads for magnetic recording and reproducing apparatus has presented a particularly difficult problem inasmuch as a portion of the magnetic circuit must be exposed for cooperation with the magnetic recording medium. Magnetic records usually utilize as the recording medium a magnetizable wire, tape or disk and signals are impressed on the medium by a so-called recording head. The recording head is similar in structure to the head shown diagrammatically in FIG. 4. It is of relatively low impedance and the magnetic field generated thereby for magnetizing the recording medium is far greater than stray magnetic fields. Accordingly the signal impressed on the recording medium passing in contact with the exposed portion of the magnetic core will have an excellent signal to noise level, the noise in this case being considered unwanted signals caused by stray ambient fields produced by electromagnetic devices such as A.C. motors, transformers and the like and generally recognizable as "hum."

The magnetic pickup head differs from the recording head in that it is a relatively high impedance device that will produce an electric signal of reasonable magnitude as the recording medium moves over the exposed portion of its core. However, the effect of stray fields on the pickup head will produce voltages equal to if not exceeding those produced by the recording medium. In order to minimize the effect of stray fields on the pickup head, the core and associated coils are encased within a magnetic shield with only a small part of the core exposed for cooperation with the recording medium. This procedure, of itself, is insufficient to obtain a good signal to noise level so that further shielding procedures are required to minimize the stray fields themselves. While the medium and magnetic heads can be wholly enclosed within magnetic shields, such procedure is not satisfactory for many reasons, as for instance high cost, impracticability, added weight. So-called "humbucking" coils have been used in circuit with the pickup head. These humbucking coils are mounted close to the pickup head and are oriented in such a manner that they will produce a signal of a phase and magnitude intended to cancel the unwanted hum signals produced in the pickup head. This procedure has not been found satisfactory as it is not possible to effect stable and dependable cancellation and even under ideal conditions the improvement is often of questionable value.

The magnetic head in accordance with the invention overcomes the stray field problem in an effective and dependable manner and provides substantial hum reduction even in the presence of strong stray fields without the need of excessive shielding, humbucking coils or other costly procedures heretofore deemed necessary.

For illustrative purposes, a conventional magnetic pickup head is shown in FIG. 4 and comprises a magnetic core 10 formed of two selections 11 and 12. The core sections 11 and 12 are joined together to form upper and lower magnetic gaps 13 and 14 (which will be generally referred to as "air gap" as they usually include a non-magnetic material) and each core section is provided with a coil 15, 16. The coils are generally connected in series and the output voltage therefrom is fed to suitable amplifying apparatus. The core and coil assembly is then enclosed within an outer shield 17 of magnetic material and the shield is filled with a suitable insulating resin 18. Since the core sections 11 and 12 must cooperate magnetically with the recording medium such as the tape 19, having a surface of magnetic material 20 on the underside thereof, at least part of the air gap 13 and the adjoining core pole pieces 11' and 12' are exposed.

Hum is produced in the pickup head by stray fields or flux lines entering the exposed core parts. These flux lines are diagrammatically represented by the dotted lines *a*, *b* and *c*. The lines *a* and *b* are effectively prevented from affecting the core 10 and producing a voltage in the coils 15 and 16. However, the line *c* does enter the shield and passes through the core 10 and coils 15 and 16. The field produced in the core 10 by this flux line will produce a substantial unwanted signal or hum in the coils 15 and 16.

It has been found that the unwanted signal produced by the flux entering the exposed part of the core 10 can be effectively cancelled by controlling the admission of stray flux into the opposite end of the core. In so doing a signal of opposite phase and equal magnitude can be produced to provide an excellent signal to noise or hum level even in the presence of strong stray magnetic fields.

One procedure for the attainment of this end is shown in FIG. 5. The bottom of the sheld 17 has been removed to partially expose the lower air gap 14. Opening the shield in this manner will produce partial cancellation of the hum as evidenced by the entry of the flux lines *a* and *d* into the lower end of the core 10. In order to increase the magnitude of the cancelling signal a magnetic collector 21 is positioned in proximity to the core. By adjustment of this collector the amount of stray flux entering the core 10 can be adjusted so that effective cancellation of hum in the pickup coil is attained.

Another system for controlling the magnitude of the cancelling signal is shown in FIG. 6. In this case a pair of magnetic collectors 22 and 23 are utilized and held in spaced relationship to form an air gap 24 therebetween. This procedure provides somewhat greater latitude in control of the cancelling signal. While it is preferable to use the air gap 24 between the collectors 23 and 22, in some cases it may be omitted and a single magnetic element or collector 25 as shown in FIG. 7 may be employed.

If for any reason the bottom of the shield 17 of FIG. 4 cannot be removed, cancellation of hum can be effected in accordance with the invention by the embodiments of the invention shown in FIGS. 8, 9 and 10. In FIG. 8, a pair of collectors 26 and 27 are utilized. Each collector is formed of magnetic material and extends from the bottom of the core 10 within the shield 17 upwardly beyond the top thereof. The ends of the collectors are bent outwardly as shown at 26' and 27' and the lengths of these outwardly bent parts are adjusted to induce stray fields of sufficient intensity into the lower end of the core to effect the desired hum cancellation.

The embodiment of the invention shown in FIGS. 9 and 10 provides for the induction of stray fields to the exposed portions 11' and 12' of the core 10 in a manner that will effect automatic cancellation. This is attained by the use of a pair of ring-like collectors 28 and 29 each having an opening 28' and 29' respectively for engaging one of the core parts 11' and 12'. As shown in FIG. 10, the opening 28' in the ring 28 engages the core part 12' and extends past the core part 11'. The second ring 29 overlies part of the ring 28 and has its opening 29' in engagement with the core part 11'. With this arrangement a portion of a stray field approaching the head from the right as shown in FIG. 10 will enter the core 10 through the core part 12' and leave through the core part 11'. Another portion of the field will be intercepted by the ring 29, enter the core through the core part or pole piece 11' and leave through the core part 12' and ring 28. By properly coordinating the rings 28 and 29 with the core 10, they will induce a counter field within the core 10 to balance out the normal effect of the stray field directly on the core.

The preferred embodiment of the invention is shown in FIGS. 1 to 3 and is generally along the lines of that shown in FIG. 6. The magnetic head is generally denoted by the numeral 30 and includes a core 31 of magnetic material. The core is formed in two similar sections 32 and 33 and each carries a coil, diagrammatically illustrated at 34 and 35, respectively. The coils are connected in series and to the output leads 36 and 37. While the head may be mounted in any suitable manner, for convenience mounting means in the form of an externally threaded bushing 38 fastened to the outer peripheral shield 39 has been illustrated. The lead wires 36 and 37 from the coils extend through this bushing and the bushing in turn is fastened in a cooperating opening in a suitable mounting bracket 40.

It will be observed that the shield 39 is a peripheral one so that the upper and lower parts of the core 31 as viewed in FIG. 1 and the associated air gaps will be exposed. The upper end of the head is partially closed by a halo or ring 41 of magnetic material. This ring includes a central opening 42 through which the upper end of the core 31 extends and the peripheral dimensions of the ring are adjusted so that it will be at least coextensive with the opening in the shield 39. This ring may be cemented or otherwise secured in place on the head as shown in FIGS. 2 and 3 and functions to limit the intensity of the stray fields entering the magnetic circuit through the exposed core parts.

The underside of the head is provided with a pair of magnetic collector elements 43 and 44 secured in spaced, end to end relationship by a clip 45 of non-magnetic material. The collectors are supported by a narrow L-shaped bracket member 46 fastened to the bracket member 40 by a pair of screws 47. The screws 47 extend through enlarged holes 48 in the bracket 40 and threadably engage the bracket 46 so the latter can be moved to tilt the collectors toward and away from the bottom section of the core 31.

Actual tests with the embodiment of the invention shown in FIGS. 1 to 3 indicate that noise (hum from stray fields) can be reduced more than 30 db below the hum level of conventional shielded heads. To illustrate the operation of the invention, a magnetic head with exposed top and bottom core portions was placed in a magnetic field that produced an output voltage on the output leads of the order of 135 millivolts. Since both the top and bottom parts of the core were exposed some cancellation was already effected. With the halo or ring 41 in place a reduction in level of about 12 db was observed. With the halo removed and collectors 43 and 44 in place a hum reduction of about 1.2 db was observed. By using both the halo 41 and collectors 43, 44 a hum reduction of over 30 db was obtained. The use of both the halo and collectors is preferred as this procedure enables the size of the collectors to be reduced. The halo 41 can be eliminated by increasing the size of the collectors so that the flux induced into the bottom of the core 31 can be increased in magnitude to effect cancellation. If desired the intensity of the field induced in the lower portion of the head can be increased by reducing the reluctance of the lower air gap between core sections 32 and 33. It is desirable, however, to maintain the normal stray field pickup by the lower air gap below that of the upper gap and then provide suitable collectors to effect cancellation or neutralization of the hum.

While only certain embodiments of the invention have been shown and described, it is apparent that modifications, alterations and changes may be made without departing from the true scope and spirit thereof.

What is claimed is:

1. A magnetic head for cooperation with a magnetic recording medium comprising a sectional core of magnetic material having a pair of gaps disposed on opposite portions thereof, at least one coil carried by said core, a magnetic shield enclosing said core and coil with at least one of said gaps and adjoining parts of said core magnetically exposed for cooperation with said medium, said exposed core part being affected by stray flux and producing an undesirable signal in said coil, and flux inducing means magnetically coupled with the exposed part of said core for producing a second flux through the core to substantially neutralize the effect of the first said stray magnetic fluxes on said head.

2. A magnetic head according to claim 1 wherein the last said means includes magnetic elements coupled with said core sections to produce two voltages in said coil responsive to the stray magnetic fields and of substantially equal magnitude and opposite phase.

3. A magnetic head comprising a core formed of at least two substantially similar parts and secured one to the other to form a closed core having at least two opposing gaps, at least one coil carried by at least one of said core parts, a magnetic shield enclosing said core and coil with at least one of said gaps and adjoining portions of the core magnetically exposed, and flux inducing means magnetically coupled with at least one core portion adjoining the other gap for inducing stray fields into said core and coil to neutralize the voltage produced by said stray fields picked up by said exposed portion of said core.

4. A magnetic head according to claim 3 wherein the last said means are in the form of elongated pieces of magnetic material with each piece being magnetically coupled with a core portion adjoining the other air gap and extending upwardly to a point spaced from said one gap and then outwardly from said one gap to form magnetic field collector elements.

5. A magnetic head according to claim 3 wherein the last said means includes at least one element of magnetic material magnetically coupled to at least one of the core portions adjoining said other gap and extending outwardly beyond said shield.

6. A magnetic head comprising a core formed of at least two parts secured one to the other to form a closed magnetic circuit with at least two oppositely disposed gaps, at least one coil carried by said core, a shield of magnetic material surrounding said core and coils with said gaps being at least partially magnetically exposed, and at least one magnetic element magnetically coupled with said core in the vicinity of one of said gaps and adjustable to direct stray magnetic fields into said head and neutralize the effect of stray fields entering said head through the other end portion of said core.

7. A magnetic head according to claim 6 wherein the last said means includes a pair of elongated magnetic elements in spaced end-to-end relationship to provide a gap therebetween and adjustable toward and away from said one gap to control the magnitude of said neutralizing field affecting said core.

8. A magnetic head comprising a core formed of at least two parts secured one to the other to form a closed magnetic circuit with at least two oppositely disposed gaps, at least one coil carried by said core, a sheld of magnetic material surrounding said core and coils with said gaps being at least partially magnetically exposed, a second shield of magnetic material surrounding one of said exposed gaps and the adjoining exposed core parts to close the area between the core and the first said shield, and means magnetically coupled with the core in the vicinity of the other gap and adjustable to control the effect of stray magnetic fields on said core and neutralize the effect of stray fields on said one gap and adjoining core parts.

9. A magnetic head according to claim 8 wherein the last said means includes a pair of elongated magnetic elements in spaced end-to-end relationship to provide a gap therebetween.

10. A magnetic head responsive to signals impressed on a magnetic recording medium comprising a core of magnetic material formed in at least two sections with the pole faces of one section overlying the pole faces of the other section to form at least two oppositely disposed gaps, a coil carried by at least one of said sections, a magnetic shield surrounding said coil and core with at least one of said gaps extending from one end thereof for cooperation with the magnetic medium, adjustable magnetic means magnetically coupled with the part of the core opposite the first said gap for directing the admission of stray fields into the last said core part to neutralize the effect of stray fields entering the core in the vicinity of said one gap.

11. A magnetic head for recording and reproducing devices utilizing a magnetic recording medium comprising a core of magnetic material, at least one coil carried by said core, an electromagnetic shield enclosing said core and coil with at least one portion of said core being exposed for cooperation with said medium, said exposed portion of said core being affected by stray flux and producing an undesirable signal in said coil, and at least one electromagnetic stray flux collecting element electromagnetically coupled to said core and extending outwardly from said electromagnetic shield, said collecting element feeding a component of stray flux into said core to produce a signal in said coil of opposite polarity and equal magnitude to said undesired signal.

12. A magnetic head for recording and reproducing devices utilizing a magnetic recording medium comprising a core of magnetic material, at least one coil carried by said core, an electromagnetic shield enclosing said core and coil with one portion of said core extending from said shield for cooperation with said medium, said shield surrounding said exposed portion of said core, being in closely spaced relation thereto, said exposed portion of said core being affected by stray flux and producing an undesirable signal in said coil, at least one electromagnetic stray flux collecting element electromagnetically coupled to said core at a point opposed to said extending portion of said core and extending outwardly and away from said electromagnetic shield, said collecting element feeding a component of stray flux into said core to produce a signal in said coil of opposite polarity and equal magnitude to said undesired signal.

References Cited in the file of this patent

UNITED STATES PATENTS

| | | |
|---|---|---|
| 2,555,110 | Bobb | May 29, 1951 |
| 2,584,984 | Camras | Feb. 12, 1952 |
| 2,633,504 | Beer | Mar. 31, 1953 |
| 2,697,135 | Gratian | Dec. 14, 1954 |
| 2,678,970 | Vilkomerson | May 18, 1954 |
| 2,708,694 | Begun et al. | May 17, 1955 |
| 2,767,253 | Camras | Oct. 16, 1956 |
| 2,813,932 | Kornei | Nov. 19, 1957 |
| 2,926,220 | Camras | Feb. 23, 1960 |